United States Patent
Khan et al.

(10) Patent No.: US 7,061,559 B2
(45) Date of Patent: *Jun. 13, 2006

(54) STACKED COLOR LIQUID CRYSTAL DISPLAY DEVICE

(75) Inventors: Asad A. Khan, Kent, OH (US);
Xiao-Yang Huang, Stow, OH (US);
Haiji Yuan, Cupertino, CA (US);
Minhua Lu, Mohegan Lake, NY (US)

(73) Assignee: Kent Displays, Inc., Kent, OH (US)

( * ) Notice: Subject to any disclaimer, the term of this patent is extended or adjusted under 35 U.S.C. 154(b) by 144 days.

This patent is subject to a terminal disclaimer.

(21) Appl. No.: 10/667,806

(22) Filed: Sep. 22, 2003

(65) Prior Publication Data

US 2005/0036077 A1    Feb. 17, 2005

Related U.S. Application Data

(60) Division of application No. 09/330,104, filed on Jun. 10, 1999, now Pat. No. 6,654,080, which is a continuation of application No. 08/823,329, filed on Mar. 22, 1997, now Pat. No. 6,034,752.

(51) Int. Cl.
*G02F 1/133* (2006.01)
(52) U.S. Cl. .......................... 349/73; 349/175
(58) Field of Classification Search .................. 349/73, 349/115, 176, 187
See application file for complete search history.

(56) References Cited

U.S. PATENT DOCUMENTS

| | | | |
|---|---|---|---|
| 3,642,348 A | 2/1972 | Wysocki et al. | |
| 3,650,603 A | 3/1972 | Heilmeier et al. | |
| 3,652,148 A | 3/1972 | Wysocki et al. | |
| 3,697,150 A | 10/1972 | Wysocki et al. | |
| 3,704,056 A | 11/1972 | Wysocki et al. | |

(Continued)

FOREIGN PATENT DOCUMENTS

EP    0123981 A2    7/1984

(Continued)

OTHER PUBLICATIONS

Crawford et al., "Reflective Color LCDs Based On H-PDLC and PSCT Technologies", SID 96 Digest, (May 1996).

(Continued)

*Primary Examiner*—Toan Ton
(74) *Attorney, Agent, or Firm*—Pearne & Gordon LLP

(57) ABSTRACT

A liquid crystal display device includes cell wall structure and a chiral nematic liquid crystal material. The cell wall structure and the liquid crystal cooperate to form focal conic and twisted planar textures that are stable in the absence of a field. A device applies an electric field to the liquid crystal for transforming at least a portion of the material to at least one of the focal conic and twisted planar textures. The liquid crystal material has a pitch length effective to reflect radiation having a wavelength in both the visible and the infrared ranges of the electromagnetic spectrum at intensity that is sufficient for viewing by an observer. One liquid crystal material may be disposed in a single region or two or more liquid crystal materials may be used, each in separate regions even without the infrared reflecting layer. One aspect of the invention is directed to a photolithography method for patterning a substrate of the display. The display may also have multicolor capabilities by including separate layers of at least two or three liquid crystal materials that reflect visible light. A full color stacked display may be produced with grey scale capabilities.

6 Claims, 6 Drawing Sheets

U.S. PATENT DOCUMENTS

| | | | |
|---|---|---|---|
| 3,806,230 A | 4/1974 | Haas | |
| 3,821,720 A | 6/1974 | Greubel et al. | |
| 3,891,307 A | 6/1975 | Tsukamoto et al. | |
| 4,097,127 A | 6/1978 | Haas et al. | |
| 4,234,437 A | 11/1980 | Friberg et al. | |
| 4,239,347 A | 12/1980 | Brantz et al. | |
| 4,246,302 A | 1/1981 | Benton et al. | |
| 4,357,374 A | 11/1982 | Ogawa | |
| 4,402,999 A | 9/1983 | Tatsumichi et al. | |
| 4,448,823 A | 5/1984 | Clifford | |
| 4,505,548 A | 3/1985 | Berreman et al. | |
| 4,557,995 A | 12/1985 | Broers et al. | |
| 4,779,942 A | 10/1988 | Verney | |
| 4,780,240 A | 10/1988 | Emoto et al. | |
| 4,813,770 A | 3/1989 | Clerc et al. | |
| 4,826,620 A | 5/1989 | Heppke et al. | |
| 4,832,461 A | 5/1989 | Yamagishi et al. | |
| 4,867,536 A | 9/1989 | Pidsosny et al. | |
| 4,966,726 A | 10/1990 | Scherowsky et al. | |
| 4,973,138 A | 11/1990 | Yamazaki et al. | |
| 5,016,985 A | 5/1991 | Kalmanash et al. | |
| 5,113,272 A | 5/1992 | Reamey | |
| 5,124,818 A | 6/1992 | Conner et al. | |
| 5,170,204 A | 12/1992 | Mukai et al. | |
| 5,200,845 A | 4/1993 | Crooker et al. | |
| 5,251,048 A | 10/1993 | Doane et al. | |
| 5,268,782 A | 12/1993 | Wenz et al. | |
| 5,309,265 A | 5/1994 | Buchecker et al. | |
| 5,325,218 A | 6/1994 | Willett et al. | |
| 5,329,388 A | 7/1994 | Yoshimizu | |
| 5,371,618 A | 12/1994 | Tai et al. | |
| 5,384,067 A | 1/1995 | Doane et al. | |
| 5,399,390 A | 3/1995 | Akins | |
| 5,422,033 A | 6/1995 | Mochizuki et al. | |
| 5,437,811 A | 8/1995 | Doane et al. | |
| 5,453,863 A | 9/1995 | West et al. | |
| 5,493,430 A | 2/1996 | Lu et al. | |
| 5,495,355 A | 2/1996 | Konuma | |
| 5,506,704 A | 4/1996 | Broer et al. | |
| 5,570,216 A | 10/1996 | Lu et al. | |
| 5,661,533 A | 8/1997 | Wu et al. | |
| 5,695,682 A | 12/1997 | Doane et al. | |
| 5,731,861 A | 3/1998 | Hatano et al. | |
| 5,748,277 A | 5/1998 | Huang et al. | |
| 5,801,796 A | 9/1998 | Lowe | |
| 5,875,012 A | 2/1999 | Crawford et al. | |
| 6,034,752 A | 3/2000 | Khan et al. | |
| 6,104,448 A * | 8/2000 | Doane et al. | 349/12 |
| 6,377,321 B1 | 4/2002 | Khan et al. | |

FOREIGN PATENT DOCUMENTS

| | | |
|---|---|---|
| EP | 0123981 A3 | 7/1984 |
| EP | 0217240 | 12/1989 |
| EP | 0218132 | 10/1990 |
| EP | 0211646 | 4/1992 |
| EP | 0351746 | 12/1993 |
| JP | 760030475 | 3/1976 |
| JP | 06 22342 | 8/1994 |
| JP | 07108659 | 5/1995 |
| JP | 07 209662 | 8/1995 |
| JP | 08 304 788 | 11/1996 |
| JP | 09 218422 | 8/1997 |
| JP | 52-113386 | 9/1997 |
| WO | WO 94/10260 | 5/1994 |

OTHER PUBLICATIONS

F. Moia, "New Liquid Crystal Mixtures For Supertwisted LCDs With Low Tendency For Fingerprint Textures", Central Research Units, Dept ZFE/RLC.4002 Basil, Switzerland, pp. 1-12, (Mar. 1989).

Kawata, Yasushi et al., "A High Reflective LCD With Double Cholesteric Liquid Crystal Layers", pp. 246-249, Toshiba Corporation (1997).

Gerber, P.R., "Compensation Of Temperature Dependence Of Transmission Characteristics Of Twisted Nematic Displays By Cholesteric Dopands", Plysics Letter, vol. 78A, No. 3, pp. 285-299 (1980).

Hochgesand, R. et al., "Helical Twisting Power Of Chiral Dopants In Nematic Liquid Crystal", pp. 1-21, Industrial Chemicals Division—Dept. Of Physical and Inorganic Research, date unknown.

D.K. Yang, et al. "Cholesteric reflective display: Drive scheme and contrast", 320 Applied Physics Letters 64, (15), pp. 1905 and 1907 (1994).

B.G. Wu et al., "Zero Field, Multistable Cholesteric Liquid Crystal Displays", The University of Texas at Arlington, pp. 476-479, date unknown.

J.W. Doane et al., "Front-Lit Flat Panel Display from Polymer Stabilized Cholesteric Textures", Japan Display '92, pp. 73-76 (1992).

D.K. Yang et al., "Cholesteric Liquid-Crystal/Polymer-Gel Dispersions: Reflective Display Applications", SID Digest, pp. 759-761 (1992).

Blinov, L.M., Electrical and Magnetic Optical Properties of Liquid Crystal:, pp. 212-225, 1983.

Sunohara et al., "A Reflective Color LCD Using Three-Layer GH-Mode", SID 96 Digest, pp. 1-7.

"Liquid Crystals-Applications and Uses" Birenda Bahadur vol. 2, pp. 130-156, World Scientific Publishing Co., Singapore 1991.

"Additive Colour Properties and Colour Gamut of Cholesteric Liquid Crystals", David M. Makow and C. Leroy Sanders, Nature, vol. 276, Nov. 2, 1978, pp. 48-50, MacMilliam Journals 1978.

Reflective Cholesteric Liauid-Crystal Displays, J. William Doane and Michael C. Stefanov, Information Display, Dec. 1996, pp. 18-21.

European Search Report, dated Mar. 8, 2004.

* cited by examiner

STACKED COLOR LIQUID CRYSTAL DISPLAY DEVICE

This application is a divisional of U.S. patent application Ser. No. 09/330,104 filed on Jun. 10, 1999, now U.S. Pat. No. 6,654,080 which is a continuation of application of U.S. patent application Ser. No. 08/823,329, filed on Mar. 22, 1997, now U.S. Pat. No. 6,034,752, issued on Mar. 7, 2000.

This application was made in part with United States Government support under cooperative agreement N61331-96C-0042 awarded by the Defense Advanced Research Projects Agency (DARPA). The government has certain rights in this invention.

BACKGROUND OF THE INVENTION

Field of the Invention

Cholesteric displays are bistable in the absence of a field, the two stable textures being the reflective planar texture and the weakly scattering focal conic texture. In the planar texture, the helical axes of the cholesteric liquid crystal molecules are substantially parallel to the substrates between which the liquid crystal is disposed. In the focal conic state the helical axes of the liquid crystal molecules are generally randomly oriented. By adjusting the concentration of chiral dopants in the cholesteric material, the pitch length of the molecules and thus, the wavelength of radiation that they will reflect, can be adjusted. Cholesteric materials that reflect infrared radiation have been used for purposes of scientific study. Commercial displays are fabricated from cholesteric materials that reflect visible light.

Liquid crystal displays are useful as instrumentation in vehicles. For example, commercial airlines employ LCD instrumentation in the cockpits. Vehicles such as for military use, may use LED or LCD instrumentation. In military vehicles used to conduct stealth night operations, such as army helicopters, pilots wear night vision detectors or goggles that enable them to view objects in the air and on the ground without using visible light. The night vision goggles enable the wearer to view infrared radiation, such as the heat from the motor of an automobile. The night vision goggles may also utilize the ambient infrared light from the night sky to view objects that do not emit infrared radiation. The night vision goggles are worn spaced from the eyes of the pilot so that the LED instrumentation panels can be read when the wearer looks down, without looking through the goggles. Use of current night vision goggles limits the depth perception of the wearer. In addition, visible light may saturate the night vision goggles and render them ineffective. The goggles thus may filter out certain wavelengths of visible light.

SUMMARY OF THE INVENTION

The present invention is directed to a liquid crystal display including a single chiral nematic liquid crystal material or at least two chiral nematic liquid crystal materials, which can reflect light across a particular range of wavelengths. One aspect of the invention is directed to a display that reflects in both the visible and infrared ranges of the electromagnetic spectrum at an intensity that is observable to the human eye. The radiation in the infrared spectrum is observed using a device suitable for detecting infrared radiation, such as night vision goggles. Another aspect of the invention is the cell wall configurations of the displays. The invention may employ a single cell using one chiral nematic liquid crystal that reflects in the visible and in the infrared ranges or at least two liquid crystal cells each having a different chiral nematic liquid crystal disposed in each. When two or more cells are used, the cells may be stacked on top of one another. The chiral nematic liquid crystal composition may be tailored to have a certain peak intensity and bandwidth according to the invention. Although the preferred operation of the inventive display utilizes light reflecting from the liquid crystal, it would be appreciated by those skilled in the art in view of this disclosure that the display may be used in a transmissive mode using backlighting.

In general, the present invention is directed to a liquid crystal display device comprising cell wall structure and a chiral nematic liquid crystal material. The cell wall structure and the liquid crystal cooperate to form focal conic and twisted planar textures that are stable in the absence of a field. A device applies an electric field to the liquid crystal for transforming at least a portion of the material to at least one of the focal conic and twisted planar textures. The liquid crystal material reflects radiation having a wavelength in both the visible and the infrared ranges of the electromagnetic spectrum at intensity that is sufficient for viewing by an observer. In particular, the liquid crystal has a positive dielectric anisotropy. At least about 20% of the radiation incident on the material is preferably reflected from the material. The liquid crystal material may have an optical anisotropy of at least about 0.10.

In one embodiment of the invention, the display device employs a single liquid crystal material that is disposed in one region and yet reflects both visible and infrared radiation. This is accomplished by selecting the peak reflection wavelength of the radiation and by broadening the bandwidth or the range of wavelengths in which the radiation is reflected.

Another embodiment of the invention utilizes two regions, a liquid crystal material being disposed in each region. The cell wall structure forms a first region in which a first chiral nematic liquid crystal material is disposed and a second region in which a second chiral nematic liquid crystal material is disposed. The first liquid crystal reflects radiation having a wavelength in the visible range and the second liquid crystal material reflects radiation having a wavelength in the infrared range.

The particular cell wall structure that is used to form the two regions may be a stacked display employing three, four or more substrates. The liquid crystal material is disposed between opposing substrates. In one aspect using four substrates the first region is disposed between first and second substrates and the second region is disposed between third and fourth substrates. The first and second regions are arranged in series with respect to one another in the direction toward the observer. In this regard, the first liquid crystal reflecting visible light is disposed downstream of the liquid crystal reflecting infrared radiation in the direction toward the observer. In the case of the three substrate stacked display, the first region is disposed between first and second substrates and the second region is disposed between the second substrate and a third substrate.

The spacing between substrates in the single cell display ranges from about 4 to about 10 microns. The spacing between the substrates in the stacked cell display is at least about 4 microns.

The three cell display employs a photolithography method of the present invention to form a substrate that employs patterned electrodes on both sides. This substrate can be used in any stacked display. This method of the invention includes applying radiation in the ultraviolet region of the electromagnetic spectrum through a mask. The radiation is reflected through a substrate, each opposing surface of the substrate containing a layer of photoresist material over a conductive layer disposed on the surface. The photoresist layer is exposed to the UV radiation on both sides of the substrate. Exposed photoresist material and underlying electrode material are removed from the substrate to form an electrode pattern on both surfaces of the substrate.

In particular, the ultraviolet radiation is applied at a level effective to compensate for the transmission loss of the photoresist, the electrode and the substrate.

The ultraviolet radiation is applied at a level that is at least two times the level of ultraviolet radiation that is normally used to expose photoresist on a substrate.

A preferred embodiment of the present invention is directed to instrumentation of the type that is used by personnel employing a night vision detector such as goggles. The instrumentation reflects light having a wavelength in the visible region of the electromagnetic spectrum. This embodiment of the present invention has military applications, such as use in instruments in the cockpit of army helicopters. The present invention includes a liquid crystal display device comprising cell wall structure and a chiral nematic liquid crystal material. The cell wall structure and the liquid crystal cooperate to form focal conic and twisted planar textures that are stable in the absence of a field. A device applies an electric field to the liquid crystal for transforming at least a portion of the material to at least one of the focal conic and twisted planar textures. The liquid crystal material can reflect radiation having a wavelength in the visible and infrared regions of the spectrum at an intensity sufficient for viewing by the personnel.

Another aspect of the present invention is a multicolor stacked cell display that reflects infrared and visible radiation. The display device comprises cell wall structure and a chiral nematic liquid crystal material. The cell wall structure and the liquid crystal cooperate to form focal conic and twisted planar textures that are stable in the absence of a field. The cell wall structure forms first, second and third regions in which first, second and third chiral nematic liquid crystal materials are disposed, respectively. A device applies an electric field to at least one of the first, second and third liquid crystal materials for transforming at least a portion of these materials to at least one of the focal conic and twisted planar textures. The first and second liquid crystal materials have a pitch length effective to reflect radiation in the visible range of the electromagnetic spectrum and the third liquid crystal has a pitch length effective to reflect radiation in the infrared range of the spectrum. The visible and infrared radiation has an intensity sufficient for viewing by an observer.

Particular features of the color display are that the first liquid crystal may have a pitch length effective to reflect light of a first color and the second liquid crystal material may have a pitch length effective to reflect light of a second color. The display may include at least one other region in which a liquid crystal material that can reflect light in the visible range. For example, three visible cells may be used, resulting in a full color display.

In the stacked color display, when using substrates having patterned electrodes on only one side, the first region is disposed between first and second substrates, the second region is disposed between third and fourth substrates and the third region is disposed between fifth and sixth substrates. Alternatively, when using a substrate with electrodes patterned on both sides, the first region is disposed between first and second substrates, the second region is disposed between the second substrate and a third substrate and the third region is disposed between the third substrate and a fourth substrate. The first and the second regions are disposed downstream of the third region with respect to the direction from the display toward the observer. The invention may also include at least one colored material layer or a black layer transparent to infrared radiation. The colored material is disposed at the back substrate of a visible cell that is adjacent the infrared cell. The infrared transparent black layer may be disposed at the back of a visible cell. Also, a black layer may be adjacent the rearmost substrate of the infrared cell.

A method of making a display that can reflect infrared and visible radiation according to the invention includes adjusting the pitch length of a chiral nematic liquid crystal material so that the material reflects radiation having a wavelength in the visible and in the infrared ranges of the electromagnetic spectrum. Opposing substrates are spaced apart at a distance effective to provide the visible and infrared radiation with an intensity sufficient for viewing by an observer. The material is filled between the substrates such that the cell wall structure cooperates with the liquid crystal to form focal conic and twisted planar textures that are stable in the absence of a field. Also, connected is device for applying an electric field to the liquid crystal for transforming at least a portion of the material to at least one of the focal conic and twisted planar textures. The bandwidth of reflectance from the display may be broadened by using liquid crystal material having an optical anisotropy of at least about 0.10.

The present invention offers numerous features and advantages that have heretofore not been possible. A display reflecting both visible and infrared radiation enables use during the night and day, without compromising the electrooptical characteristics of the display. Moreover, the stacked cell feature of the invention enables ease of manufacture and modification for various applications. For example, variations in color and contrast may be attained utilizing colored or black layers on one or more of the substrates. Both cells of any stacked display, by tailoring the chiral nematic liquid crystal material in each cell, may be operated utilizing the same waveforms and driving voltages.

The photolithography method of the invention reduces the scattering of the stacked display. Also, no index matching material is needed between substrates. The method exposes the photoresist on both sides of the substrate using a single exposure step. Without this step, separate photolithography and wet chemical etching would have to be performed on each side of the substrate to pattern the electrodes. Also, for high resolution displays greater than 100 dots per inch, the electrode patterns must be registered to within 10 microns to avoid parallax problems. The double exposure technique cuts the photolithography and etching steps in half while automatically aligning the electrode patterns, since only one UV exposure is used to expose photoresist coated on both sides of the substrate.

The display of the invention may employ frontlighting and can utilize ambient visible or infrared radiation. Those skilled in the art would also appreciate that the invention may be modified to be suitable for backlighting. The display may be fabricated to include a device for directing either visible or infrared radiation onto the display. Alternatively, infrared radiation may be reflected from the night vision goggles toward the infrared reflecting display. In the case of military vehicles such as helicopters, the apparatuses surrounding the cockpit, for example, may provide ambient infrared radiation sufficient to illuminate the display. So, too, may visible light from instrumentation in the cockpit be sufficient to illuminate the visible display.

The present invention would be useful in any application in which it is desirable to have a display reflecting in the infrared and visible ranges. The invention may be suitable for use in instrumentation in helicopter or airplane cockpits, such as those that include numerical displays. Other applications include a display that can reflect infrared and visible light for use in a global positioning system that enables the user to determine his location based upon satellite information. Such a display could be used by foot soldiers employing night vision goggles who can read the display using only infrared radiation. In instances in which night vision goggles are used, since the wearer can view the infrared reflecting display through the goggles, the goggles may be worn closer to the face. This may improve viewing through the goggles.

Many additional features, advantages and a fuller understanding of the invention will be had from the accompanying drawings and the detailed description that follows.

DETAILED DESCRIPTION OF PREFERRED EMBODIMENTS

Figure 1:
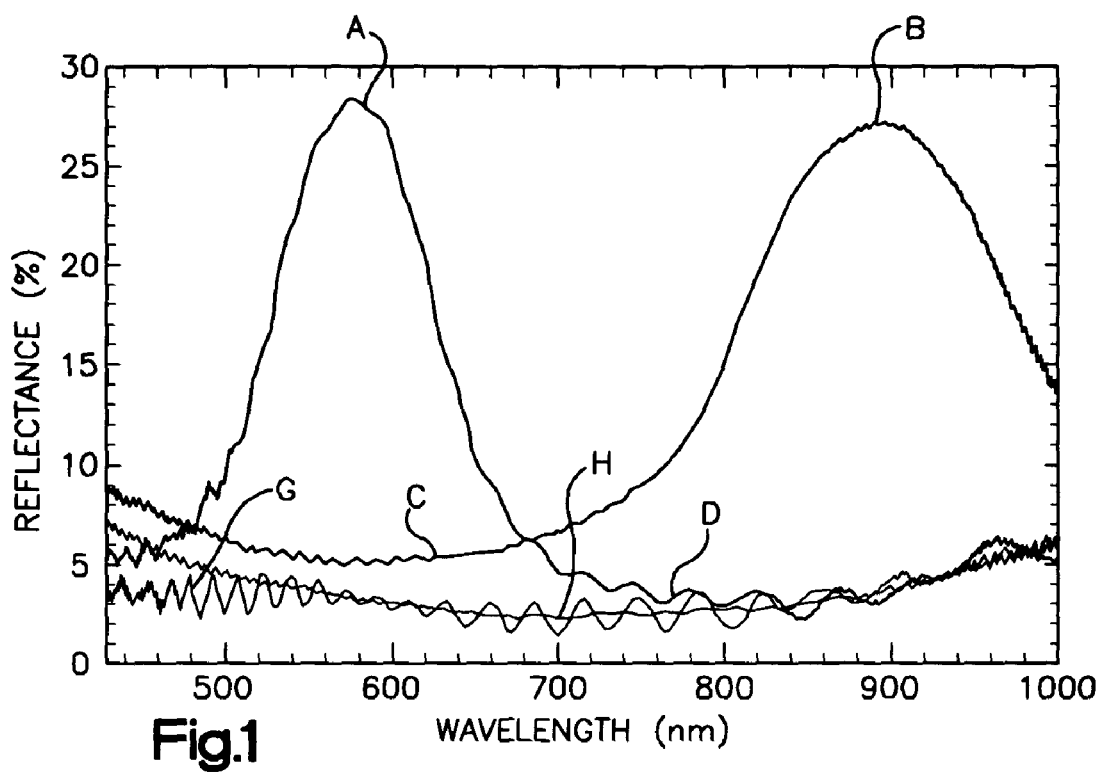
FIG. 1 is a graph showing the reflectance as a function of wavelength for a cell that reflects visible light and a cell that reflects infrared light, constructed according to the present invention.

The present invention is directed to a liquid crystal display device that comprises cell wall structure and chiral nematic liquid crystal material having positive dielectric anisotropy. The cell wall structure and the liquid crystal cooperate to form focal conic and twisted planar textures that are stable in the absence of a field. A device enables an electric field to be applied to the liquid crystal for transforming at least a portion of the material to at least one of the focal conic and twisted planar textures. Upon applying the electric field the liquid crystal material can reflect radiation having a wavelength in both the visible and infrared ranges of the electromagnetic spectrum at intensity sufficient for viewing by an observer.

The concentration of the chiral material is selected to provide the composition with a pitch length effective to reflect radiation of a predetermined wavelength. The concentration of chiral material is selected so that the display reflects radiation in the infrared region. Reference to the infrared region herein is the region of the spectrum having a wavelength of at least about 700 nanometers (nm) and, in particular, at least about 780 nm. The concentration of chiral material is also selected so that the display reflects radiation in the visible region. Reference to the visible region herein means the region of the spectrum having a wavelength that is not greater than 780 nm and, more preferably, the wavelength region ranging from about 400 to about 650 nm. The chiral material can also be present in an amount that produces a pitch length effective to reflect visible light of desired colors.

The displays of the invention may employ different cell wall configurations. The invention may employ a single cell using only one chiral nematic liquid crystal material between opposing substrates reflecting both visible and infrared radiation. The display may also include at least two liquid crystal cells each including a different chiral nematic liquid crystal. When using at least two cells, one cell includes a chiral nematic liquid crystal material having a pitch length effective to enable the liquid crystal to reflect visible light and the other cell includes a chiral nematic liquid crystal having a pitch length effective to enable the liquid crystal to reflect infrared radiation.

The pitch length of the liquid crystal materials of the invention are adjusted based upon the following equation (1):

$$\lambda_{max} = n_{av} \cdot p_0 \quad (1)$$

where $\lambda_{max}$ is the peak reflection wavelength (wavelength at which reflectance is a maximum), $n_{av}$ is the average index of refraction of the liquid crystal material, and $p_0$ is the natural pitch length of the cholesteric helix.

Definitions of cholesteric helix and pitch length and methods of its measurement, are known to those skilled in the art such as can be found in the book, Blinov, L. M., *Electro-optical and Magneto-Optical Properties of Liquid Crystals*, John Wiley & Sons Ltd.

1983. The pitch length is modified by adjusting the concentration of the chiral material in the liquid crystal composition. For most concentrations of chiral dopants, the pitch length induced by the dopant is inversely proportional to the concentration of the dopant. The proportionality constant is given by the following equation (2):

$$P_0 = 1/(HTP \cdot c) \quad (2)$$

where c is the concentration in % by weight of the chiral dopant and HTP is the proportionality constant.

When filled into a single cell, the pitch length is adjusted to enable the device to reflect radiation in both the visible and the infrared regions of a sufficient intensity that can be observed by the human eye. For the cell to reflect in the infrared spectrum, $\lambda_{max}$ is preferably in the infrared region and is preferably within $\Delta\lambda/2$ of the infrared region, where $\Delta\lambda$ is the bandwidth of the reflection peak. This ensures that enough light is reflected to achieve suitable contrast. In this regard, it is preferable to design the chiral nematic composition of the single cell display so that the device reflects radiation of about 700 nm. Those skilled in the art would appreciate in view of this disclosure that the maximum wavelength peak may have a wavelength that is lowered further into the visible region if reflecting a broader range or a higher intensity of visible light is desired. Conversely, the maximum wavelength peak may have a wavelength that is increased further into the infrared range if reflecting a broader range or a higher intensity of infrared radiation is desired.

A chiral nematic liquid crystal has a relatively long pitch length in order to reflect infrared radiation compared to a composition that reflects visible light. In a two cell display, the pitch length of the composition reflecting infrared radiation is adjusted to be longer than the pitch length of the composition reflecting visible light. The spacing between opposing cell walls must be widened to accommodate a longer pitch length so that a desired number of pitches is obtained in the cell. The number of pitches generally believed desirable for a cell to have sufficient reflectance or brightness and thus, contrast, is about 12–15. In a single cell, the cell spacing must be adjusted so that the reflected radiation has an intensity that is high enough to be observed. This is also true in the case of the infrared cell of the stacked display—a longer cell spacing is used.

The reflection spectrum of a cholesteric material typically has a full width at half maximum (FWHM) on the order of about 100 nm for a pitch length that enables the liquid crystal to reflect yellow light. The bandwidth may be widened as desired in the case of the single cell, so that part of the reflection curve is in the visible region and part of the reflection curve is in the infrared region.

In a single cell display, the typical 100 nm bandwidth is not wide enough to achieve good contrast with respect to both the visible and the infrared ranges. Therefore, the liquid crystal composition is tailored to broaden the reflection bandwidth. The width of the reflection band of the chiral nematic liquid crystal is given by the following equation (3):

$$\Delta\lambda = p_0 \cdot \Delta n \quad (3)$$

where $\Delta n$ is the optical anisotropy of the liquid crystal and $\Delta\lambda$ is the bandwidth.

Increasing the pitch length will broaden $\Delta\lambda$. However, $\Delta\lambda$ may also be broadened by increasing the $\Delta n$ of the liquid crystal. To enable the single cell display to be suitable for reflecting radiation in both the visible and infrared regions, the chiral nematic composition is tailored to have an optical anisotropy of at least about 0.10. It should be within the purview of the skilled chemist to prepare a chiral nematic liquid crystal composition having an optical anisotropy of at least about 0.10. The operation of a visible display and an infrared display is shown in FIG. 1. It will be understood that all of the graphs of this application show aspects of the performance of the displays of the present invention for purposes of explanation only and are not intended to show the optimum or ideal performance of the displays of the present invention or the conditions of their use. The composition of the visible and infrared cells of FIG. 1 are the same as provided in Example 1 hereafter. Although the data of FIG. 1 was derived from separate visible and infrared cells that were not stacked, it illustrates the expected behavior for both the single cell display and the stacked display. An integrating sphere was used to measure the spectral reflectance under diffuse illumination.

In FIG. 1 the oscillations of the focal conic (weakly scattering) textures are caused by the interference of the light due to the substrates. Curve A is the reflectance from a cell designed to reflect visible light. Curve B is the reflectance from a cell designed to reflect infrared radiation. The cells were in the reflective twisted planar state when the curves A and B were produced. The measurements were conducted with black paint on the back of the visible cell and the infrared cell to improve contrast.

The peak reflectance of both displays is surprisingly at least about 20% reflectance and, in particular, between at least about 25% and 30% reflectance. It is unexpected that such a high reflectance can be obtained from a cell reflecting infrared radiation. This relatively high reflectance of the infrared cell was obtained through the use of a relatively large cell spacing. FIG. 1 illustrates that the spectral bandwidth changes as the pitch length, and hence the peak wavelength of reflected radiation, changes. The curve B had a greater bandwidth FWHM (170 nm) than the curve A bandwidth FWHM (100 nm).

One advantageous feature of the stacked display is the effect that each of the planar infrared and visible curves have in the other's region of the spectrum. The portion C of the planar infrared curve has a reflectance at wavelengths below 650 nm of greater than 5%. The portion of the planar visible curve D has a reflectance at wavelengths above 700 nm that is less than 5%. The infrared cell scatters light in the visible region, but the visible cell does not scatter much in the infrared region. Positioning the visible cell in front of the infrared cell thus provides it with better contrast. However, the infrared cell may be located in front of the visible cell despite these concerns.

The rearmost substrate of each display is preferably painted black. The black paint absorbs infrared radiation that reaches the back of the display. In the case of the stacked cell display, the contrast may be improved by painting the back substrate of the last visible cell black. The paint should be transparent to infrared radiation. This effectively provides the visible cell with a black background that improves its contrast, and yet, does not alter the viewing characteristics of the infrared display. Paint such as black paint, which is transparent in the infrared region, is known to those skilled in the art. For example, many types of black paint used to print the letters on computer keys are transparent to infrared radiation. The substrates of a visible cell may also be painted other colors. The substrates are comprised of glass or plastic as is known to those skilled in the art. Glass substrates may comprise fused silica, soda lime glass or borosilicate glass, for example.

Infrared detectors such as night vision goggles typically employ filters that remove unwanted visible light. In addition to carefully tailoring the liquid crystal composition of the single cell display to obtain a suitably broad bandwidth, the infrared detector may need to be tuned for use with the single cell display of the present invention, to adjust the absorption wavelengths of its visible light filters and allow selected visible light to pass through. For example, the goggles may be tuned to allow visible light having red and yellow wavelengths to pass through.

Figure 2:
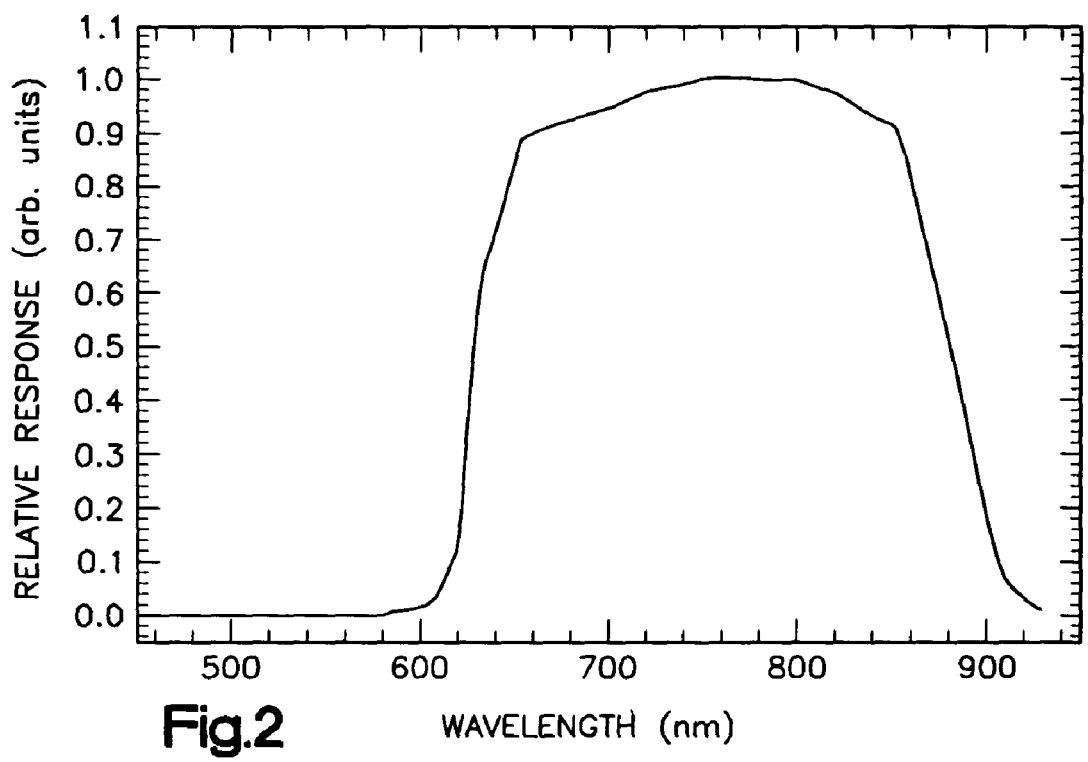
FIG. 2 shows the spectral sensitivity of infrared detecting goggles.

When the goggles are used with the stacked cell display, the display may be tailored to meet the manufacturer's specifications regarding the spectral sensitivity of the detector. FIG. 2 illustrates a typical spectral sensitivity of Class A night vision goggles, model number AN/PVS-7B, manufacturer's identification No. 66868-300030-1, manufacturer unknown. This Figure shows that although there is not a perfect correlation between the current sensitivity of the goggles and the reflectance curve of the infrared display, these goggles would work well with a single cell display having a peak wavelength $\lambda_{max}$ of about 700 nm. If the stacked cell display of the invention is intended to be used with the goggles of FIG. 2, the infrared curve may be moved so that its peak $\lambda_{max}$ is centered over the region of the goggles, ie., at about 750 nm.

Figure 3:
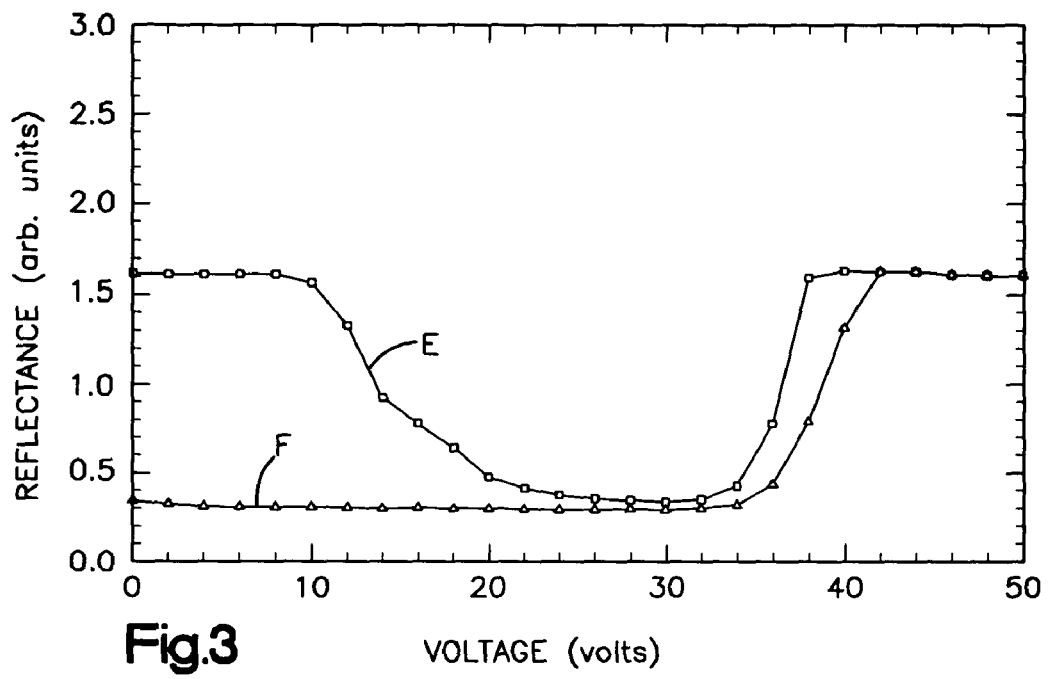
FIG. 3 shows an electrooptical response of a cell that reflects visible light.

FIG. 3 shows the electrooptical characteristics of a visible cell. This curve was prepared using a visible cell having a liquid crystal composition provided in Example 1 hereafter. Curve E shows the cell in the planar reflecting state before the pulse whereas curve F shows the cell in the scattering focal conic state before the pulse. The electrooptical response curve of the infrared cell is very similar to that of the visible cell and both curves have the same voltage levels. This graph was obtained in a conventional manner using a monochrome light source, the voltage being applied in two volt steps. The voltage known as $V_3$ needed to drive the material shown in the curve E from the bright planar state to the dark, mostly focal conic state was about 32 volts AC. The voltage known as $V_4$ needed to drive the material of the curve F from the dark focal conic state to the bright reflective state, was about 42 volts AC.

Since the electrooptical response characteristics of the infrared and visible cells of a stacked display have been matched with similar driving voltage levels, the two displays may be driven simultaneously, independent of the method of coupling the two cells. The same waveforms and controllers can be used to drive both the visible and infrared cells of the stacked display. The viscosity of the cell is influenced by the pitch length. One would not expect that the two cells could use similar driving voltages. The viscosity of the infrared cell is less than that of the visible cell due to its longer pitch length. This lower viscosity requires a lesser driving voltage. However, using a larger spacing of the substrates of the infrared cell requires a greater driving voltage. As a result of the lowered viscosity but greater cell spacing of the infrared cell, the driving voltage of the visible and infrared cells are similar.

Figure 4:
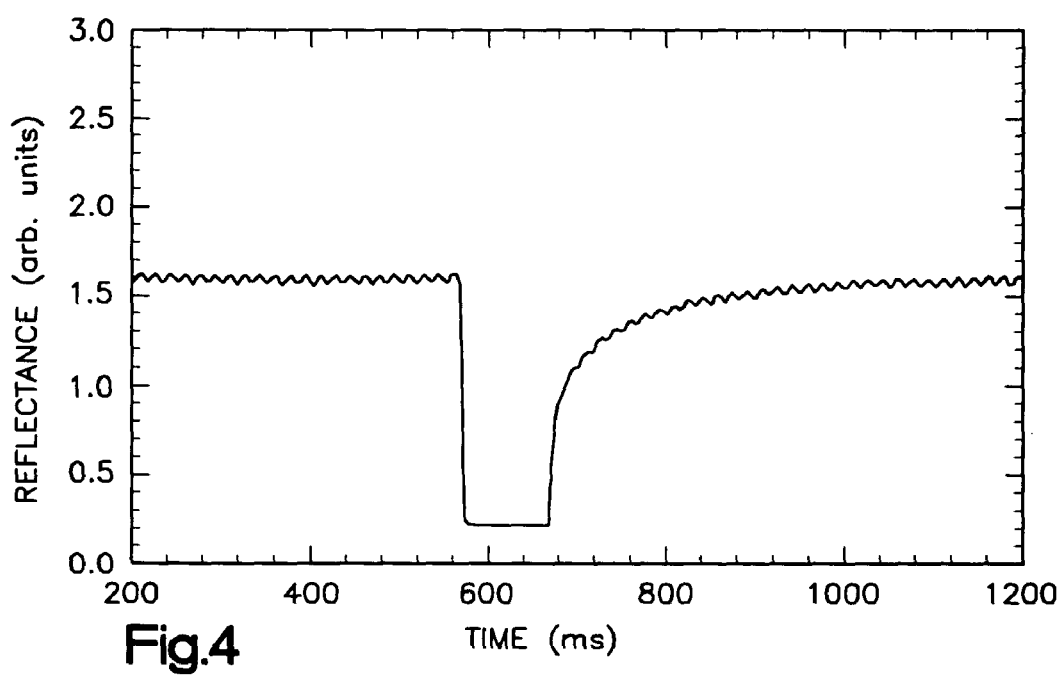
FIG. 4 shows the relaxation time of a cell that reflects visible light.

FIG. 4 shows a graph of reflectance as a function of time (ms) for a visible cell and illustrates the relaxation time from the homeotropic texture to the planar texture. This curve was prepared using a visible cell having a liquid crystal composition provided in Example 1 hereafter. FIG. 4 was obtained by using an AC voltage having a 100 ms pulse width. The pulse was applied at about 580 ms and turned off at about 680 ms. The relaxation time will be shorter for the infrared cell.

The present invention may employ any suitable driving schemes and electronics known to those skilled in the art, including but not limited to the following, all of which are incorporated herein by reference in their entireties: Doane, J. W., Yang, D. K., *Front-lit Flat Panel Display from Polymer Stabilized Cholesteric Textures*, Japan Display 92, Hiroshima October 1992; Yang, D. K. and Doane, J. W., *Cholesteric Liquid Crystal/Polymer Gel Dispersion: Reflective Display Application*, SID Technical Paper Digest, Vol XXIII, May 1992, p. 759, et seq.; U.S. patent application Ser. No. 08/390,068, filed Feb. 17, 1995, entitled "Dynamic Drive Method and Apparatus for a Bistable Liquid Crystal Display" and U.S. Pat. No. 5,453,863, entitled "Multistable Chiral Nematic Displays." A passive matrix multiplexing type display is preferably used in the present invention. The effect that pulse amplitudes and widths, and speeds of field removal have on each texture is described in the U.S. Pat. No. 5,453,863.

The liquid crystal of the present invention is addressed by applying an electric field having a preferably square wave pulse of a desired width. The voltage that is used is preferably an AC voltage having a frequency that may range from about 125 Hz to about 2 kHz. Various pulse widths may be used, such as a pulse width ranging from about 6 ms to about 50 ms. The present invention may utilize the addressing techniques described in the U.S. Pat. No. 5,453,863 to effect grey scale.

The display of the invention may utilize ambient visible and infrared radiation or an illumination source on the display or on the night vision goggles. The radiation incident upon typical cholesteric displays has components that correspond to the peak wavelength of the display. One way to illuminate a cell to reflect infrared radiation is to shine infrared radiation upon the display. In military applications such as for use on instrumentation in the cockpit of a military helicopter, the illuminating radiation may be infrared only, which preserves the darkness of the cockpit. It may also be possible to utilize the infrared content of the night sky derived in part from the moon and the stars. The infrared radiation of the night sky may even be sufficient on an overcast night because the infrared radiation may filter through the clouds.

An example of a single cell display is shown in U.S. Pat. No. 5,453,863, entitled Multistable Chiral Nematic Displays, which is incorporated herein by reference in its entirety. The spacing between the substrates of the single cell display may range from about 4 microns to about 10 microns.

Figure 5:
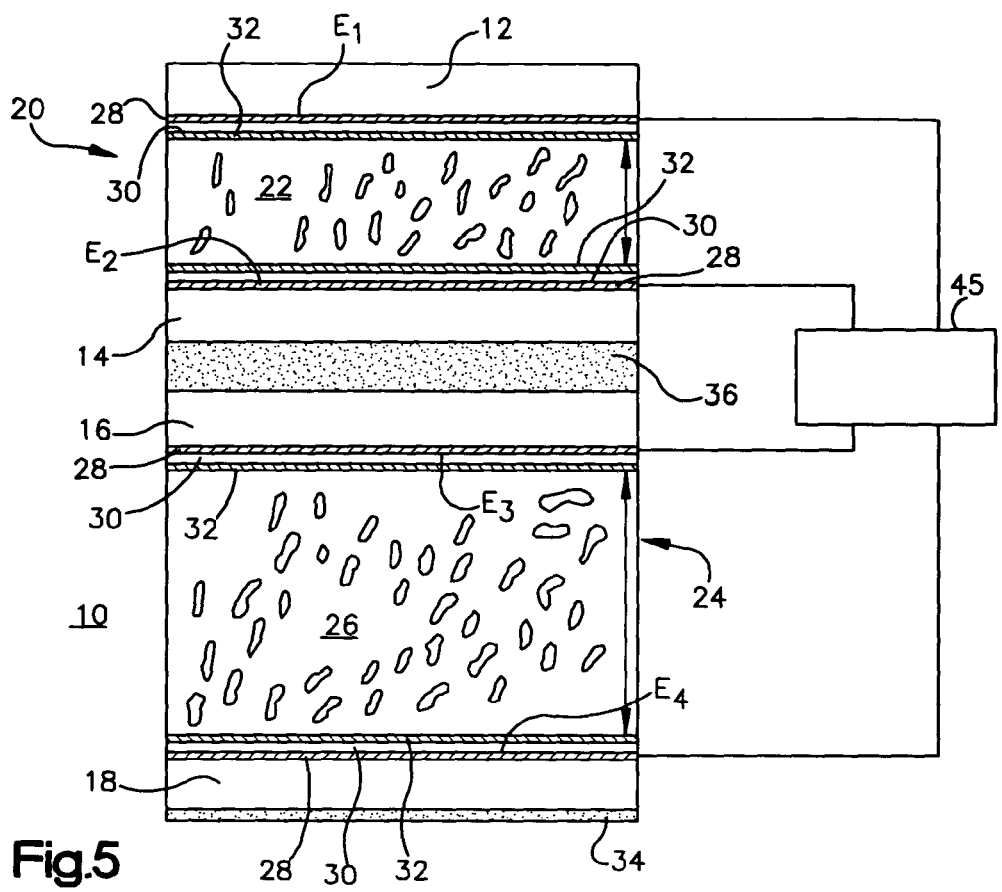
FIG. 5 shows a stacked display employing four substrates and a cell that reflects visible light and a cell that reflects infrared radiation, constructed according to the present invention.

One example of a display having two stacked cells is shown generally at 10 in FIG. 5. This particular display employs four glass substrates 12, 14, 16 and 18.

One cell 20 includes a first chiral nematic liquid crystal material 22 disposed between the opposing substrates 12 and 14. The substrate 12 is nearest an observer. Another cell 24 on which the cell 20 is stacked includes a second chiral nematic liquid crystal 26 disposed between the opposing substrates 16 and 18.

The first liquid crystal 22 includes a concentration of chiral material that provides a pitch length effective to enable the material to reflect visible light. The second liquid crystal 26 includes a concentration of chiral material that provides the material with a pitch length effective to enable the material to reflect infrared radiation.

The substrates 12, 14, 16 and 18 each have a patterned electrode such as indium tin oxide (ITO), a passivation material and an alignment layer 28, 30, 32, respectively. The back or outside of the substrate 18 is coated with black paint 34. The purpose of the ITO electrode, passivation material and alignment layer will be explained hereafter.

An index of refraction-matching material 36 is disposed between the substrates 14 and 16. This material may be an adhesive, a pressure sensitive material, a thermoplastic material or an index matching fluid. The adhesive may be Norland 65 by Norland Optical Adhesives. The thermoplastic material may be a thermoplastic adhesive such as an adhesive known as Meltmount, by R. P. Cargile Laboratories, Inc. This thermoplastic adhesive may have an index of refraction of about 1.66. The index matching fluid may be glycerol, for example. When an index matching fluid is used, an independent method of adhering the two cells together is employed. Since both textures of the second cell are transparent to visible light, the stacking of the cells does not require accurate alignment or registration of the two cells. The spacing between the substrates 12 and 14 of the first cell ranges from about 4 to about 6 microns. The spacing between the substrates 16 and 18 of the second cell ranges from about 4 to about 10 microns and greater.

The driver circuitry 45 is electrically coupled to four electrode arrays E1, E2, E3 and E4, which allow the textures of regions of the liquid crystal display to be individually controlled. As discussed in the prior art, application of a voltage across the liquid crystal material is used to adjust the texture of a picture element. The electrode matrix E1 is made up of multiple spaced apart conductive electrodes all oriented parallel to each other and all individually addressable by the driver electronics 45. The electrode array E2 spaced on the opposite side of the liquid crystal material 22 has an electrode array of spaced apart parallel electrodes. These electrodes are arranged at right angles to the electrodes of the matrix E1. In a similar manner the matrix array E3 has elongated individual electrodes at right angles to the elongated individual electrodes of the matrix array E4.

Figure 6:
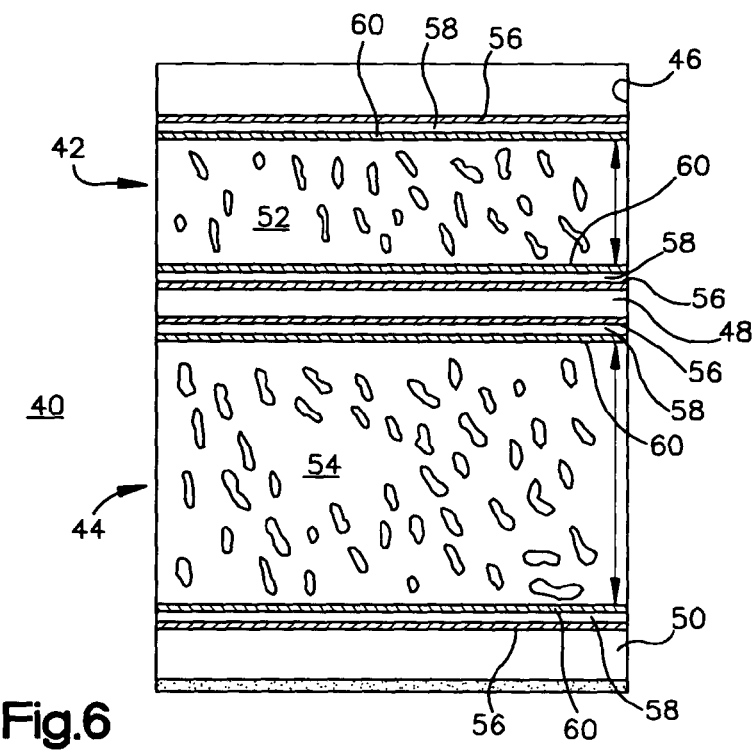
FIG. 6 shows a stacked display employing three substrates and a cell that reflects visible light and a cell that reflects infrared radiation, constructed according to the present invention.

Another stacked cell display is generally shown as 40 in FIG. 6. This display 40 includes a visible cell 42 and an infrared cell 44 and includes substrates 46, 48 and 50. A third chiral nematic liquid crystal 52 is disposed between the substrates 46 and 48 of the visible cell. The substrate 46 is nearest the observer. A fourth chiral nematic material 54 is disposed between the substrates 48 and 50 of the infrared cell.

The third liquid crystal has a concentration of chiral additive that provides it with a pitch length effective to reflect visible light. The fourth liquid crystal material has a pitch length effective to reflect infrared radiation.

The spacing between the substrates 46 and 48 of the visible cell ranges from about 4 to about 6 microns. The spacing between the substrates 48 and 50 of the infrared cell ranges from about 4 to about 10 microns and greater.

The third and fourth liquid crystal materials may be the same or different than the first and second liquid crystal materials. The visible cell 42 is preferably disposed downstream of the infrared cell in the direction from the infrared cell toward the observer. No index matching material needs to be used in the three substrate stacked display.

The three substrate stacked display 40 is fabricated by a method according to the present invention. In the three substrate display shown in FIG. 6, the middle substrate 48 is disposed between the substrates 46 and 50 and is in common with the visible and infrared cells. The middle substrate 48 acts as the back substrate of the visible cell and the front substrate of the infrared cell. The common substrate 48 has conductive, passivation, and alignment layers 56, 58 and 60, respectively, coated on both sides. By passivation layer is meant an insulating layer that prevents front to back shorting of the electrodes. The substrates 46 and 50 have patterned electrode, passivation, and alignment layers 56, 58 and 60 coated on only one side.

The fabrication of the three substrate display utilizes an inventive photolithographic technique. Photoresist material, passivation material and an alignment material are applied to the substrate by spin coating. The alignment material is used for providing the liquid crystal molecules with a generally homeotropic texture adjacent the substrate for stabilizing the focal conic texture. The spin coating process is conducted at a rotational speed of several thousand rpm for about 30 seconds, each time in this process. The soft bake is conducted at about 90° C. each time in this process. To enable application by spin coating, the photoresist, passivation and alignment materials include solutes of these materials in solution.

The conductive coating is preferably comprised of transparent indium tin oxide (ITO), however, any conductive coating having good optical transmission may be utilized, such as conductive polymers and tin oxide. One example of a suitable passivation material is a $SiO_2$-like material known as NHC-720A, which is manufactured by Nissan Chemical. The alignment material is manufactured by Nissan Chemical No. SE-7511L. The photoresist coating is spin coated to a thickness of about 2 microns ±½ micron. The passivation layer is spin coated to a thickness ranging from about 400 to about 1000 angstroms, and, in particular, in this process at about 400 angstroms. The alignment layer is spin coated to a thickness of about 250 angstroms ±50 angstroms.

Figure 7:
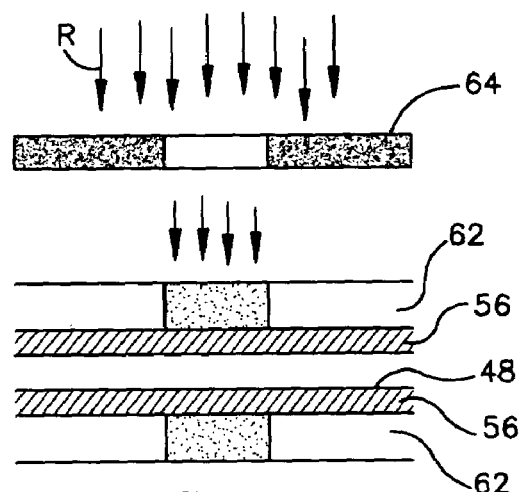
FIG. 7 shows a photolithography method of making a substrate having patterned electrodes on both sides, according to the present invention.

Photoresist material 62 is first spin coated onto one side of the substrate 48 and then soft baked on a hotplate to flash off the solvents in the photoresist material. The substrate is then removed from the hotplate and cooled to room temperature. The substrate is then flipped over and photoresist material 62 is coated onto the opposite side. This side is then soft baked on a hotplate and cooled to room temperature. The substrate is then exposed to ultraviolet (UV) radiation R through a mask 64 as shown in FIG. 7. One particular mask had thickness of elongated strips of material of about 245 microns and a spacing between strips of about 9 microns. The mask may comprise chrome oxide or iron oxide made by Hoescht. The UV radiation exposes the photoresist 62 on both sides of the substrate 48, since the substrate, the conductive coatings 56 and the layer of photoresist 62 transmit UV radiation through to the lower surface of the substrate.

Figure 8:
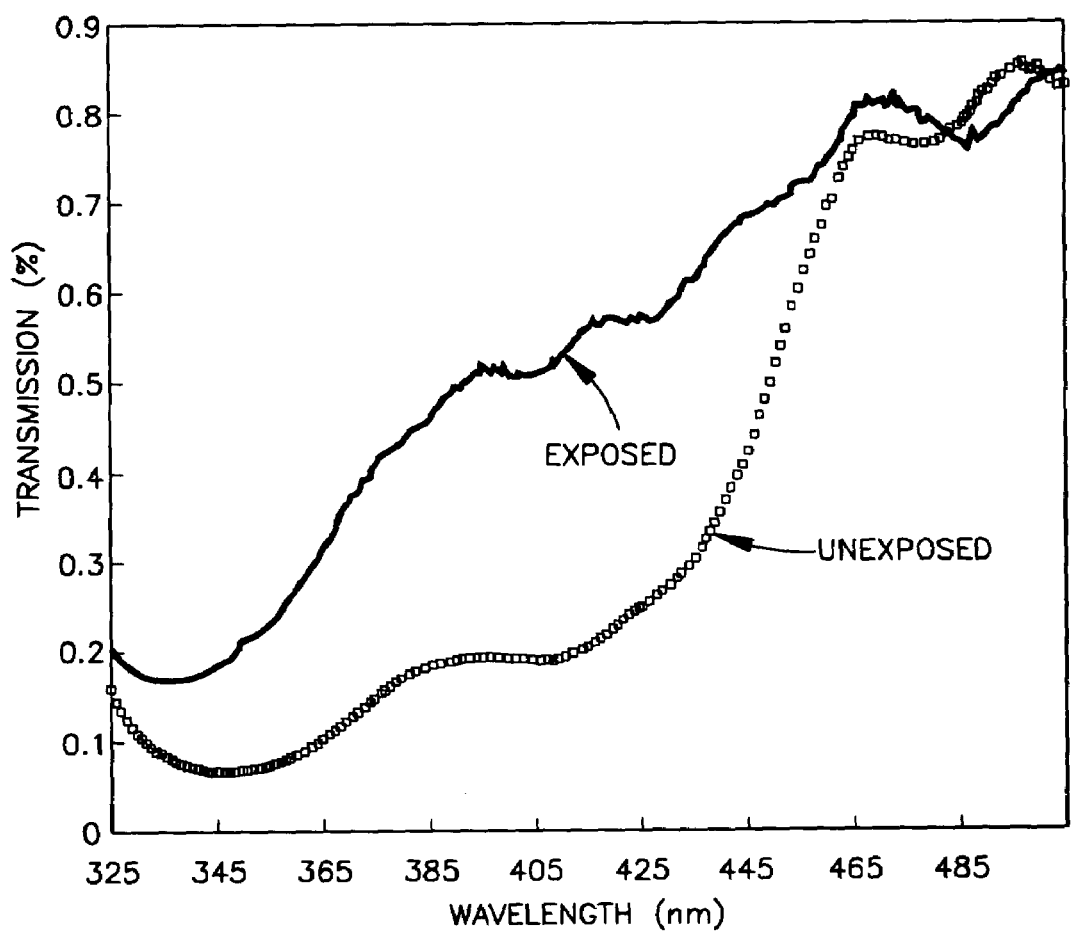
FIG. 8 shows the transmission of a photoresistive material.
Figure 9:
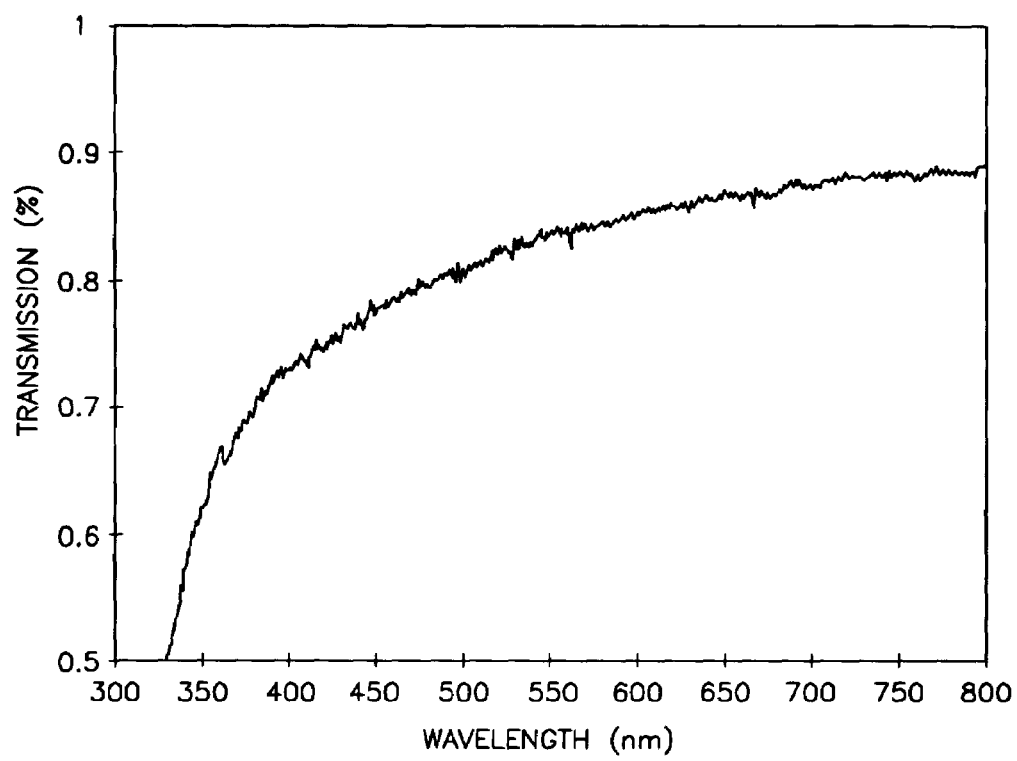
FIG. 9 shows the transmission of a glass substrate with electrode coatings on both sides.

The dose of UV radiation must be increased about four times above the level normally required to expose a single layer so that the bottom photoresist layer is completely exposed. This is to correct for the optical transmission loss of the substrate, ITO coatings and photoresist FIG. 8 shows the optical transmission of photoresist AZ 1518 obtained from Hoescht, as a function of wavelength. The average optical transmission in the spectral region in the range of from 365 to 436 nm is about 40% after exposure to broadband UV radiation at a dose of 150 milli-Joules/centimeter$^2$. FIG. 9 shows the optical transmission of the second substrate having 20 mil ITO coatings on both sides, as a function of wavelength. The optical transmission was about 70% to radiation having wavelengths greater than about 400 nm. The optical transmission of the ITO coated-substrate/photoresist combination is the product of the 40% optical transmission and the 70% optical transmission, or about 28%. This illustrates that the dose must be increased by a factor of about four to insure 100% dose on the bottom substrate with the addition of a small margin, using these materials.

The value of the UV dose is that which is sufficient to compensate for the optical transmission loss due to the electrode-coated glass substrate and photoresist. The UV dose required to expose the bottom photoresist depends upon the composition of the ITO coating, the glass substrate and the photoresist, since not all commercially available products will have the same optical transmission. The following Table 1 illustrates the transmission of a fused silica substrate and a high transmission ITO material, which may be obtained from the company, General Vacuum.

| Wavelength (nm) | Transmission (%) of bare substrate | Transmission (%) of ITO + substrate | Transmission (%) of ITO | Transmission (%) of substrate with ITO on both sides |
|---|---|---|---|---|
| 365 | 92 | 85 | 92 | 78 |
| 400 | 92 | 90 | 98 | 88 |
| 436 | 92 | 88 | 96 | 85 |

The fused glass had the same optical transmission (92%) as the borosilicate glass in the above wavelength region of UV radiation. The estimated transmission of the glass substrate with ITO on both sides is calculated by squaring the transmission of the ITO (to account for the two layers) and then multiplying by the transmission of the substrate. The average transmission over the above spectral range is 85%. The optical transmission of the General Vacuum ITO and the Hoescht photoresist is 34% (0.4×0.85). Thus, the dose necessary to completely expose the bottom of the substrate would be at least about 3 times the dose used to expose the resist on one surface of the substrate for these materials.

Another photoresist may be obtained from Shipley (Microposit S1800) that has an optical transmission after exposure of about 60% in the region ranging from 365 to 436 nm. The estimated transmission of the Shipley photoresist and the General Vacuum ITO is 51%. Therefore, the dose necessary to completely expose the bottom of the substrate would be at least about 2 times the dose used to expose the resist on one surface of the substrate.

The substrate side which was first coated with photoresist must be closest to the mask during exposure, since a photosensitive compound in the photoresist degrades with increased baking time. Exposure is incomplete if the side baked longer is placed on the bottom. The first coated photoresist which has been baked twice, by being on the top, sees a larger dose of radiation. This ensures that the now upper photoresist layer is completely exposed despite its decreased sensitivity to the UV radiation. The UV dose necessary to completely expose the photoresist on the top and bottom of the substrate is thus generally at least about 2 times the dose normally used to expose the photoresist on one surface of the substrate.

After the exposure step, the photoresist pattern is developed, baked and then placed in an acid bath to etch away unwanted regions of the ITO and create the electrode pattern on both sides of the substrate. The area where the radiation contacts the photoresist is washed away with a developer, one suitable developer being potassium hydroxide. The electrode under this region is removed with acid. One suitable acid is a hydrochloric/nitric acid solution. One part of an aqueous hydrochloric acid solution at a concentration of 37% by volume was added to one part of water. Added to this was 5% of an aqueous nitric acid solution at a concentration of 70% by volume. The substrate is then cleaned and coated with a passivation layer 58 on one side and baked in the oven to cure.

The elongated electrode strips each had a width of about 244 microns. A space of about 15 microns between adjacent electrode strips was on one side of the substrate and a space of about 20 microns between adjacent electrode strips was on the other side. Of course, the spacing may be reduced by employing a collimated light source. The electrode strips have a thickness of about 250 to about 275 microns. A resolution of about 100 dots per inch was obtained. Those skilled in the art would appreciate that this process may be modified to obtain displays having different electrode thickness, spacing and resolution.

The passivation layer is then coated on the opposite side and baked in an oven to cure. The alignment layer 60 is coated onto the substrate and cured in an oven. The alignment layer is then coated onto the opposite side and baked in an oven to cure on shims so as not to damage the previous alignment coating. Gasket seals are printed and spacers (not shown) are applied onto the outer substrates which have a patterned electrode, passivation and alignment layers. The substrates are stacked together, aligned, pressure is applied to set the cell gap and the gasket seal is cured. The substrates are then cut to size. The liquid crystal mixture is injected into each cell using a vacuum filling technique. The cells are plugged, ledges are cleaned and black paint is applied to the bottom substrate. The display is then bonded to the drive electronics with a flexible connector.

The above photolithography technique produces the same electrode pattern on both sides of a substrate. The display design must be compatible with this approach. The existing design of a ⅛ video graphics adaptor (VGA) display was extended to use the three substrate stacked display by replacing the bottom substrate, which would normally have the column electrodes, with a substrate with column electrodes and coatings on both sides. The common substrate is sandwiched between identical substrates with row electrodes, passivation and alignment layer coatings.

Figure 10:
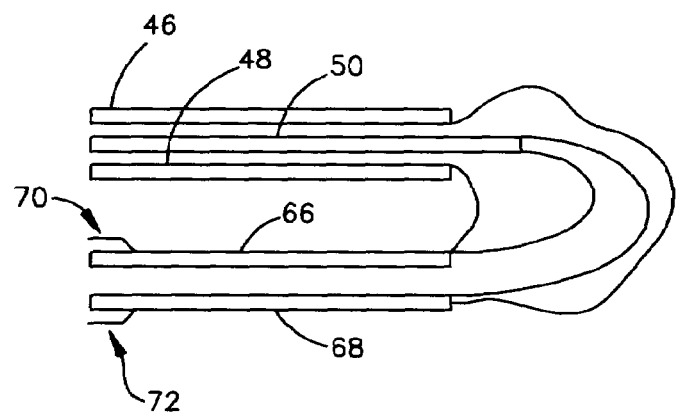
FIG. 10 shows electronics for the display shown in FIG. 6.

Referring to FIG. 10, the three substrates 46, 48 and 50 support spaced apart electrode matrices (not shown). Facing electrodes are aligned perpendicularly to each other and are individually energized by two driver circuits 66, 68. The driver circuits are connected by edge contacts 70, 72 to a logic circuit for controlling energization of the matrix arrays. Each of the driver circuits utilizes CMOS LCD driver chips to produce appropriate energization waveforms. Model SED 1744 drivers for the column drivers and SED 1743 for the row drivers are commercially available from S-MOS Systems, Inc., San Jose Calif. Data sheets for these circuits are incorporated herein by reference.

Figure 11:
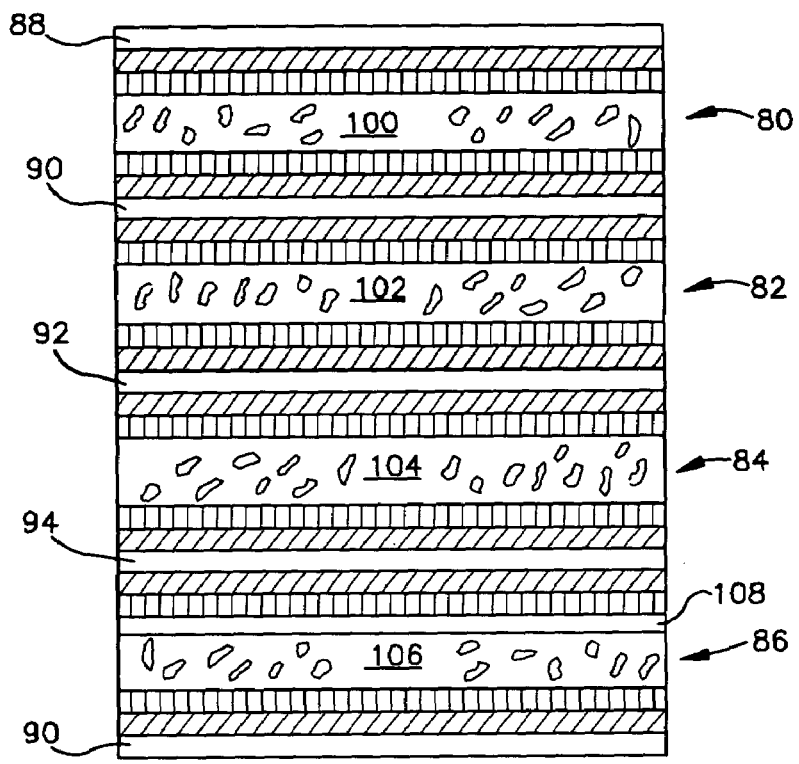
FIG. 11 shows a stacked display having multicolor capabilities constructed according to the present invention, including three cells that reflect visible light and a cell that reflects infrared radiation.

The stacked display may also be fabricated to reflect multiple colors. In this regard, two, three or more cells that reflect visible light may be used. FIG. 11 shows one example of a stacked multi-color display. First, second and third visible reflecting cells 80, 82 and 84 are stacked in series in front of an infrared reflecting cell 86. The display includes substrates 88, 90, 92, 94 and 96. Substrate 88 is disposed closest to an observer at the front of the cell and the substrate 96 is disposed at the back of the display. First, second and third chiral nematic liquid crystal materials 100, 102 and 104 have a pitch length effective to reflect visible light. Liquid crystal material 106 has a pitch length effective to reflect infrared radiation.

This particular display employs substrates having electrodes on both sides, prepared according to the photolithography method of the present invention. However, the arrangement shown in FIG. 5 may be employed as well, in which case eight substrates may be used. Index matching material would then be employed between adjacent substrates. Passivation and alignment layers are also disposed on the substrates.

Each of the liquid crystals 100, 102 and 104 has a concentration of chiral additive that produces a pitch length effective to reflect a different wavelength of visible light than the others. The liquid crystal compositions may be designed to reflect light of any wavelength. For example, the first cell 80 may reflect red light, the second cell 82 may reflect blue light and the third cell 84 may reflect green light. In addition, to achieve a brighter stacked cell display, the liquid crystal in one cell may have a different twist sense than the liquid crystal of an adjacent cell for infrared/visible displays and color displays. For example, in a three cell stacked display, the top and bottom cells may have a right handed twist sense and the middle cell may have a left handed twist sense.

The back substrate of each cell may be painted a particular color or a separate color imparting layer 108 may be used. Examples of color imparting layers suitable for use in the present invention are provided in U.S. Pat. No. 5,493,430, entitled "Color, Reflective Liquid Crystal Displays," which is incorporated herein by reference in its entirety. The back substrate of the visible cell that is furthest from the observer may be painted black or a separate black layer may be used to improve contrast, replacing layer 108.

The bistable chiral nematic liquid crystal material may have either or both of the focal conic and twisted planar textures present in the cell in the absence of an electric field. In a pixel that is in the reflective planar state, incident light is reflected by the liquid crystal at a color determined by the selected pitch length of that cell. If a color layer or "backplate" 108 is disposed at the back of that cell, light that is reflected by the pixel of that cell in the reflective planar state will be additive of the color of the liquid crystal and the color of the backplate. For example, a blue reflecting liquid crystal having an orange backplate will result in a generally white light reflected from the pixel in the reflective planar state. A pixel of the cell that is in the generally transparent focal conic state will reflect the orange color of the backplate to produce a white on orange, orange on white display. If a black layer is used at the back of the cell, rather than a colored backplate, the only color reflected will be that of the planar texture of the liquid crystal, since the black layer absorbs much of the other light. The color imparting layers of the visible cells and the black layer at the back substrate of the last visible cell are transparent so to enable light to travel to the next cell.

In the case of two or more cells, some incident light is reflected by the planar texture of the first cell at a particular color. Two or even three of the cells may be electrically addressed so as to have their liquid crystal transformed into the reflecting planar state, in which case the color reflected from the display would be produced by additive color mixing. Since not all of the incident light is reflected by the liquid crystal of the first cell, some light travels to the second cell where it is reflected by the planar texture of the second cell. Light that travels through the second cell is reflected by the planar texture of the third cell at a particular color. The color reflected by the first, second and third cells is additively mixed. The invention can reflect the colors of selected cells by only transforming the particular cell into the reflecting planar texture, the other cells being in the focal conic state. In this case, the resultant color may be monochrome.

Moreover, by utilizing grey scale by a process such as that disclosed in the U.S. Pat. No. 5,453,863, one or more cells of the display may be made to reflect light having any wavelength at various intensities. Thus, a full color display may be produced. The display may also be made to operate based upon principles of subtractive color mixing using a backlighting mode. The final color that is produced by various combinations of colors from each liquid crystal material, different colored backplates, and the use of grey scale, can be empirically determined through observation. The entire cell may be addressed, or the cell may be patterned with electrodes to form an array of pixels, as would be appreciated by those skilled in the art in view of this disclosure. The driver electronics for this display would be apparent to those skilled in the art in view of this disclosure.

The spacing between substrates of the visible cells of FIG. 11 is uniform. However, the visible cell spacing may be adjusted as desired. For example, a cell that reflects blue light employs a relatively small pitch length. Therefore, the cell spacing needed to accommodate enough pitches for suitable reflectance may be decreased. As a result, the cell may have a smaller spacing, which enables the cell to be driven at a lower voltage than the cells having a larger spacing.

Two, three or more visible cells may be employed in conjunction with the infrared cell, as shown in FIG. 11. Alternatively, a display may include two, three or more visible cells without an infrared cell. The design of such a display may be similar to that shown in FIG. 5, except that the infrared cell would be replaced by a cell that reflects visible light. The liquid crystal composition, composition of additives, cell fabrication and operation of such a stacked multiple color, visible cell display would be apparent to those skilled in the art in view of this disclosure.

The chiral nematic liquid crystal compositions suitable for use in the present invention may vary depending upon their use in the single cell or the stacked cell display. In the case of the single cell display the liquid crystal composition generally comprises a chiral nematic material ranging from about 58 to about 70%. Nematic material may be used in the range of from about 30 to about 42%. All amounts of materials provided herein are in % by weight unless otherwise indicated.

In the case of the stacked cell display, each visible cell comprises a liquid crystal material generally comprising chiral nematic material ranging from about 70 to about 100% and nematic material ranging from 0 to about 30%. The infrared cell has a liquid crystal composition comprising chiral nematic material ranging from not greater than about 58% and a nematic material ranging from at least about 42%. The nematic material may be added to adjust the concentration of the chiral material and thus, the pitch length of the composition. Alternatively, it will be appreciated that a chiral dopant may be added to a base nematic material in specific amounts to produce the desired pitch length.

The bistability of the liquid crystal composition may be obtained using a polymer network or surface treatment, but requires neither. The polymer stabilized cholesteric texture (PSCT) displays employ substrates having surface treatment that promotes homogeneous alignment, with the liquid crystal material including small amounts of monomer and photoinitiator. For a description of suitable polymer stabilized compositions and their cell fabrication, refer to the Doane and Yang articles cited above as well as to U.S. Pat. No. 5,570,216, entitled "Bistable Cholesteric Liquid Crystal Displays with Very High Contrast and Excellent Mechanical Stability;" U.S. Pat. No. 5,251,048, entitled "Method and Apparatus for Electronic Switching of a Reflective Cholesteric Display" and U.S. Pat. No. 5,384,067, entitled "Grey Scale Liquid Crystal Material," which are incorporated herein by reference in their entireties.

As an example of suitable components for a polymer stabilized composition, the monomer may be used in amounts ranging from about 1.0 to about 1.2% by weight based upon the total weight of the composition, one example being 4,4'-bisacryloylbiphenyl, synthesized by Kent State University. The photoinitiator is used in an amount ranging from about 0.25% to about 0.3% by weight based on the total weight of the composition, suitable examples being IRGACURE® 369 and 651 brand photoinitiators obtained from Ceiba-Geigy Corp. The amounts of chiral nematic material and nematic material in the PSCT composition may be decreased by about 1.5% from the standard composition.

Regarding the polymer free compositions, in some instances it is desirable to treat the cell walls and the electrodes with materials, such as the passsivation and alignment layers referred to above. Detergents or chemicals may be used to treat the cell walls to obtain variations in the contrast or switching characteristics. These treatments can be used to affect the uniformity of the liquid crystal, alter the stability of the various textures and to alter the strength of any surface anchoring. In addition to using a wide variety of materials for such surface treatments, the treatments on opposing substrates may differ. For example, the substrates may be rubbed in different directions, one substrate may include the treatment while the other may not, or opposite substrates may be used with different materials. As noted above, such treatments can have the effect of altering the effect of the cell response. The passivation layer or electrode material alone may sufficiently stabilize the focal conic texture. Optionally, other additives may be included in the chiral nematic liquid crystal mixture to alter the characteristics of the cell. For example, while color is introduced by the liquid crystal material itself, pleochroic dyes may be added to intensify or vary the color reflected by the cell. Similarly, additives such as fumed silica can be dissolved in the liquid crystal mixture to adjust the stability of the various cholesteric textures.

The present invention will now be described by reference to the following nonlimiting examples.

EXAMPLE 1

A stacked display was fabricated using the following compositions, in % by weight based on the total weight of the composition:

| Visible Cell | |
|---|---|
| BL100 | 75.75% |
| BL101 | 24.00% |
| G-232 | 0.250% |
| Infrared Cell | |
| BL061 | 48.0% |
| E44 | 52.0% |

In the above compositions, all liquid crystal materials were obtained from Merck, Ltd. United Kingdom. BL061 and BL100 are chiral nematic materials and BL101 and E44 are nematic materials. G-232 is a dychroic dye obtained from Nippon Kankoh-Shikiso Kenkyusho Co., Ltd., Japan. Four substrates were used. Each substrate had an ITO coating, a passivation layer and an alignment layer, respectively, in a direction away from the substrate. The alignment layer stabilizes the focal conic texture and provides the liquid crystal adjacent the layer with generally homeotropic alignment. The alignment layer was SE-7511L from Nissan Chemical. The cells were obtained from Varitronix Ltd. and Crystalloid Electronics. The infrared cell also had black paint applied to its outer surface. The liquid crystal that reflects visible light was filled through a port between two opposing substrates and the liquid crystal that reflects infrared radiation was filled through a port between two opposing substrates using a vacuum filling technique. The visible cell was filled in about an hour and the infrared cell, having a lower viscosity, was filled in less time. The visible cell had a pitch length of about 0.36 microns and the infrared cell had a pitch length of about 0.56 microns. The ports of both cells were sealed. An index matching glycerol fluid was disposed between the cells, forming a stacked display. A two part epoxy adhesive was used on the perimeter of the cells.

EXAMPLE 2

A composition for a single cell display that reflects both visible and infrared radiation included, in % by weight based on the total weight of the composition: BL061 chiral nematic material in an amount of about 60%, E44 nematic material in an amount of about 40%. A dye may also be used for improving the contrast of the reflected visible radiation. For example, a blue absorbing dye may be used, the dye eliminating the scattering of blue light at a wavelength of about 500 nm. This composition was tailored to have an optical anisotropy of about 0.26. The manufacturer, Merck, Ltd. is able to design the chiral nematic composition to have the desired optical anisotropy.

Grey Scale

The following text is taken from the U.S. Pat. No. 5,453,863, to illustrate how the stacked color display of the invention may utilize grey scale. By utilizing grey scale by a process such as that disclosed in the U.S. Pat. No. 5,453,863, one or more cells of the display may be made to reflect light having any wavelength at various intensities.

As disclosed in the U.S. Pat. No. 5,453,863, a reflective color display cell can be prepared without polymer so that it exhibits multiple optically different states, all of which are stable in the absence of an applied field. The display can be driven from one state to another by an electric field. Depending upon the magnitude and shape of the electric field pulse, the optical state of the material can be changed to a new stable state which reflects any desired intensity of colored light along a continuum of such states, thus providing a stable "grey scale." Surprisingly, these materials can be prepared without the need for polymers and the added expense and manufacturing complexities associated therewith.

Generally, a sufficiently low electric field pulse applied to the material results in a light scattering state which is white in appearance. In this state, a proportion of the liquid crystal molecules have a focal conic texture as a result of competition between any surface effects, elastic forces and the electric field. After application of a sufficiently high electric field pulse, i.e., an electric field high enough to homoeotropically align the liquid crystal directors, the material relaxes to a light reflecting state that can be made to appear as green, red, blue, or any pre-selected color depending upon the pitch length of the chiral nematic liquid crystal. The light scattering and light reflecting states remain stable at zero field. By subjecting the material to an electric field in between that which will switch it from the reflecting state to the scattering state, or vise versa, one obtains stable grey scale states characterized by varying degrees of reflection in between that exhibited by the reflecting and scattering states. When the chiral nematic liquid crystal is in a planar colored light reflecting texture and an intermediate electric field pulse is applied, the amount of material in the planar texture and the intensity of reflectivity of the colored light, decrease. Similarly, when the material is in the focal conic texture and an intermediate electric field pulse is applied, the amount of material in the planar texture will increase as will the intensity of reflection from the cell. When the electric field is removed, the material is stable and remains in the established texture to reflect that intensity of light indefinitely, regardless of which texture it started from.

If an electric field high enough to homeotropically align the liquid crystal directors is maintained, the material is transparent until the field is removed. When the field is turned off quickly, the material reforms to the light reflecting state and, when the field is turned of slowly, the material reforms to the light scattering state. In each case, the electric field pulse is preferably an AC pulse, and more preferably a square AC pulse, since a DC pulse will tend to cause ionic conduction and limit the life of the cell.

While not wanting to be bound by theory, it is believed that when the voltage is applied, a proportion of the material enters a turbid phase while the field is on. Those portions of the material that exhibit the turbid phase tend to relax to a focal conic, light scattering texture upon removal of the field. Those portions of the material unaffected by the field, i.e., those portions that do not enter the turbid phase, remain in the planar, light reflecting texture. The amount of light reflected from the cell depends on the amount of material in the planar reflecting texture. When the voltage of the electric field is increased, a higher proportion of the material enters the turbid phase while the field is on, followed by relaxation to the focal conic texture when the field is removed. Since the reflection from the cell is proportional to the amount of material in the planar reflecting texture, reflection from the cell decreases along a grey scale as a result of an increase in the magnitude of the field because more of the material enters the turbid phase and is switched to the focal conic texture. At a certain threshold voltage, which depends upon the material, substantially all of the material is switched to the focal conic texture upon removal of the field, characterized by a light scattering condition where the reflectivity of the cell is at or near a minimum. When the voltage is removed, the assumed texture is stable and will remain scattering indefinitely. When the voltage is increased further, to a point high enough to untwist the liquid crystal and homeotropically align the liquid crystal directors, the material is transparent and will remain transparent until the voltage is removed. From the homeotropic texture, the material tends to relax to the stable color reflecting planar texture upon removal of the field.

When the material is in a light scattering focal conic texture and a low voltage pulse is applied, the material begins to change texture and again stable grey scale reflectivities are obtained. Since the material here starts in the scattering focal conic texture, the grey scale reflectivities are characterized by an increase in the reflectivity from that exhibited when substantially all of the material is in the scattering focal conic texture, although it has been observed that the reflectivity may initially decrease in some samples. The increase in reflectivity is believed to be attributable to proportions of the material that become homeotropically aligned as a result of the applied field. Those proportions that are homeotropically aligned relax to a stable planar light reflecting texture upon removal of the field, while the remainder of the material exhibits the turbid phase as a result of the field and relaxes back to the focal conic texture upon removal thereof. When the voltage is increased still further to the point of homeotropically aligning substantially all of the liquid crystal, the material again appears clear and relaxes to the stable planar color reflecting texture upon removal of the field.

In short, it is believed that those proportions of the material that enter the turbid phase as the result of an applied field relax to a stable focal conic texture upon removal of the field and those portions that become homeotropically aligned due to the application of an applied field relax to a stable planar texture upon removal of the field. It is believed that the material returns to the scattering focal conic state when a high electric field is slowly removed from the homeotropically aligned liquid crystal because slow removal takes the material into the turbid phase from which it seems to consistently relax to a focal conic texture after removal of a field. When a high field is removed quickly, the material does not enter the turbid phase and thus, relaxes to the planar reflecting texture. In any case, it can be seen that electric field pulses of various magnitudes below that necessary to drive the material from the stable reflecting state to the stable scattering state, or vise versa, will drive the material to intermediate states that are themselves stable. These multiple stable states indefinitely reflect colored light of an intensity between that reflected by the reflecting and scattering states. Thus, depending upon the magnitude of the electric field pulse, the material exhibits stable grey scale reflectivity without the need for polymer. The magnitude of the field necessary to drive the material between various states will, of course, vary depending upon the nature and amount of the particular liquid crystal and thickness of the cell. Application of mechanical stress to the material can also be used to drive the material from a light scattering to a light reflecting state.

Example 1 of the U.S. Pat. No. 5,453,863

A chiral nematic liquid crystal mixture containing 37.5% by weight E48 (nematic liquid crystal from EM Chemicals) and 62.5% by weight TM74A (chiral additive from EM Chemicals) was prepared. A one inch square cell was then formed from two substrates coated with ITO. The ITO coatings of both substrates were buffed parallel to each other. 10 μm glass spacers were sprayed onto one substrate and the second substrate was sandwiched so that two of its edges overlapped the first substrate and the cell held together with clamps. Five minute epoxy (Devcon) was then used to seal the two nonoverlapping edges.

The cell was held vertically and a bead of the chiral nematic liquid crystal was placed along the top open edge of the cell. The cell then filled spontaneously by capillary action over a period of approximately 15 minutes. Once filled, the residual liquid crystal mixture is removed from the edge and the open edges sealed with five minute epoxy.

The cell was initially in the planar reflecting state. A 100 ms lower voltage pulse of about 115 volts and 1 KHz. switched the cell into the focal conic scattering state. A 100 ms higher voltage pulse of about 180 volts and 1 KHz switched the cell back to the planar reflecting state. Both the planar and focal conic states were stable in the absence of a field and the cell exhibited multiple stable grey scale reflecting states between the scattering and reflecting states.

Example 2 of the U.S. Pat. No. 5,453,863

A mixture of E48 and TM74A in a weight ratio of 0.6:1 was introduced between ITO coated glass substrates spaced 10 micrometers apart as in the previous example. The substrates were additionally coated with an unrubbed polyamide layer. The cell was initially in the focal conic, scattering texture that transmitted only about 30% of an HeNe beam through the cell. A 10 ms. 155 volt 1 KHz Ac pulse switched the cell to a planar texture reflecting green colored light. The transmission from the cell in the reflecting state was about 65%. A 95 volt pulse of the same duration and wavelength switched the cell back up the focal conic, scattering state. The cell switched between states in less than 10 ms.

Example 3 of the U.S. Pat. No. 5,453,863

A cell was prepared as in the preceding examples with a mixture of CB15, CE2 (chiral materials from EM Chemicals) and E48 nematic liquid crystal in a weight ratio of 0.15:1.15:0.7. In this cell the driving voltage was cut approximately in half because the dielectric anisotropy of the mixture was higher then when TM74A was used. The electro-optic response of this material was similar to that of Example 1.

Table I shows numerous additional examples of materials prepared according to the preceding examples. The concentration of chiral material, and the type and concentration of nematic liquid crystal were varied in these cells. In each case the chiral material was a 50:50 mixture of CE2 and CB 15. Each cell employed unrubbed ITO electrodes as the only surface treatment on the substrates. The materials in Table I all exhibited multistability in the visible spectrum, i.e., stable reflecting, scattering and grey scale states.

TABLE I

TABLE I of the 5,453,863 Patent

| Chiral Agent | Nematic LC | Thickness | Color | Multi-stability | Surface |
|---|---|---|---|---|---|
| CE2/C815 30% | E48 70% | 10 μm | Red | Yes | ITO |
| CE2/CB15 40% | E48 60% | 10 μm | Grn | Yes | ITO |
| CE2/CB15 50% | E48 50% | 10 μm | Blu | Yes | ITO |
| CE2/CB15 30% | E7 70% | 10 μm | Red | Yes | ITO |
| CE2/CB15 40% | E7 60% | 10 μm | Grn | Yes | ITO |
| CE2/CB15 30% | E31 70% | 10 μm | Red | Yes | ITO |
| CE2/CB15 40% | E31 60% | 10 μm | Grn | Yes | ITO |

The polymer free multistable color display cells of the invention exhibit a stable grey scale phenomenon characterized by the ability of the material to reflect indefinitely any selected intensity of light between the intensity reflected by the reflecting state and that reflected by the scattering state, the former being when substantially all of the material exhibits the planar texture and the latter being when substantially all of the material exhibits the focal conic texture. For purposes of this invention, the reflecting state reflects colored light at a maximum intensity for a given material, the color of the reflected light being determined by the pitch length of the chiral material. An electric field pulse of an appropriate threshold voltage will cause at least a portion of the material to change its optical state and the intensity of reflectivity to decrease. If the AC pulse is high enough, but still below that which will homeotropically align the liquid crystal, the optical state of the material will change completely to the scattering state which reflects light at a minimum intensity for a given material. In between the reflecting state, which for a given material can be considered to define the maximum intensity of reflectivity for that material, and the scattering state, which can be considered to define the minimum intensity of reflectivity, the intensity of reflectivity ranges along a grey scale, which is simply a continuum of intensity values between that exhibited by the reflecting and scattering states. By pulsing the material with an AC pulse of a voltage in between that which will convert the material from the reflecting state to the scattering state, or visa versa, one obtains an intensity of reflectivity in this grey scale range.

While not wanting to be bound by theory, it has been observed that the intensity of reflectivity along the grey scale when the material begins in the planar texture is approximately linearly proportional to the voltage of the pulse. By varying the voltage of the pulse the intensity of reflectivity of a given color can be varied proportionally. When the electric field is removed the material will reflect that intensity indefinitely. It is believed that pulses within this grey scale voltage range cause a proportion of the material to convert from the planar texture characteristic of the reflecting state, to the focal conic texture characteristic of the scattering state. The intensity of reflectivity along the grey scale is proportional to the amount of chiral material switched from the planar texture to the focal conic texture or vice versa, which is in turn proportional to the voltage of the AC pulse.

In the light reflecting state, the chiral liquid crystal molecules 40 are oriented in a twisted planar structure parallel to the cell walls. Because of the twisted planar texture the material will reflect light, the color of which depends upon the particular pitch length. In this stable reflecting state, the material exhibits maximum reflectivity that constitutes a maximum reference intensity below which the grey scale intensities are observed. The planar texture of the liquid crystal is stable without the presence of polymer. In the stable light scattering state the material exhibits its minimum intensity of reflection (i.e., maximum scattering) which defines a minimum reference intensity of reflectivity above which the grey scale intensities are observed.

Both the light reflecting state and the light scattering state as well as the grey scale states therebetween, are stable in the absence of an electric field. If the material is in the light reflecting state and a low electric field pulse is applied, the material will be driven to the light scattering state and will remain in that state at zero field. If the multistable material is in the light scattering state and a higher electric field pulse sufficient to untwist the chiral molecules is applied, the liquid crystal molecules will reform to the light reflecting state at the end of the pulse and will remain in that condition. It is to be understood that the voltages per micron of cell thickness necessary to drive the material between optical states may vary depending on the composition of the material, but that the determination of necessary voltages is well within the skill in the art in view of the instant disclosure.

If the high electric field necessary to untwist the liquid crystal molecules is maintained, the liquid crystal directors will be homeotropically aligned so that the material is transparent. If the field is slowly removed, the liquid crystal orientation will reform to the light scattering state presumably because slow removal allows a significant proportion of the material to enter the turbid phase. When the field is quickly removed, the orientation will reform to the light reflecting state. The intensities of reflectivity reflected between the reflecting state and the scattering state are stable grey scale reflectivities. Of course, the intensity value of the reflecting and scattering states may vary as the composition of the material varies, but the grey scale is defined by the range of intensities therebetween.

At voltages less than that which will transform the material from the reflecting state to the scattering state, grey scale states which are themselves stable at zero field are obtained. The reflection from the material in these grey scale states is stable because a proportion of the material is in the planar reflecting texture and a proportion of the material is in the focal conic scattering texture both of which are stable in the absence of a field.

Thus, for example, if the material is in the reflecting state and an electric field pulse is applied having a voltage insufficient to drive all of the liquid crystal into the focal conic texture, i.e., insufficient to drive the material completely to the scattering state, the material will reflect colored light of an intensity that is proportional to the amount of material that remains in the planar reflecting texture. The reflectivity will thus be lower than that reflected from the material when all of the chiral nematic liquid crystal is in the planar reflecting texture, but still higher than when switched completely to the focal conic scattering texture. As the voltage of the electric field pulse is increased, more of the chiral material is switched from the planar reflecting texture to the scattering focal conic texture and the reflectivity decreases further until the voltage of the pulse is increased to the point where all or most of the material enters the turbid phase from which it relaxes and is completely switched to the scattering state. If the voltage of the pulse is increased still further, the intensity of reflection begins to increase again until the magnitude of the pulse is sufficient to untwist most of the chiral molecules so that they will again reform to the planar light reflecting texture when the pulse is quickly removed and the material is again in the light reflecting state.

If the material is in the focal conic scattering state, an applied electric field pulse will have a much less dramatic effect on the reflectivity of the cell than when it starts in the planar texture, until the voltage reaches a magnitude sufficient to untwist the chiral material, whereby it will reform to the light reflecting state as described above, when the field is removed. Grey scale when the material starts in the focal conic texture appears to result when a proportion of the molecules untwist and homeotropically align as a result of the application of the field. This proportion of molecules then relaxes to the planar reflecting texture upon removal of the field.

The response of a cell as described above is illustrated in FIG. 12 which shows the response of the material prepared in Example 1 of the U.S. Pat. No. 5,453,863 to varying pulse voltages.

The reflectivity of the cell in response to AC pulse of varying voltages was measured. In the measurement, 100 millisecond, 1 KHz AC pulses were used. For this material an applied pulse above about 180V switched the cell into the reflecting state independent of whether the cell was in the scattering or reflecting state prior to the pulse. Maximum reflection, i.e., transmission, is observed here. The material exhibited maximum scattering when a voltage in the 130 to 140V range was applied, regardless of whether the material was in the planar or focal conic texture prior to the pulse.

Figure 12:
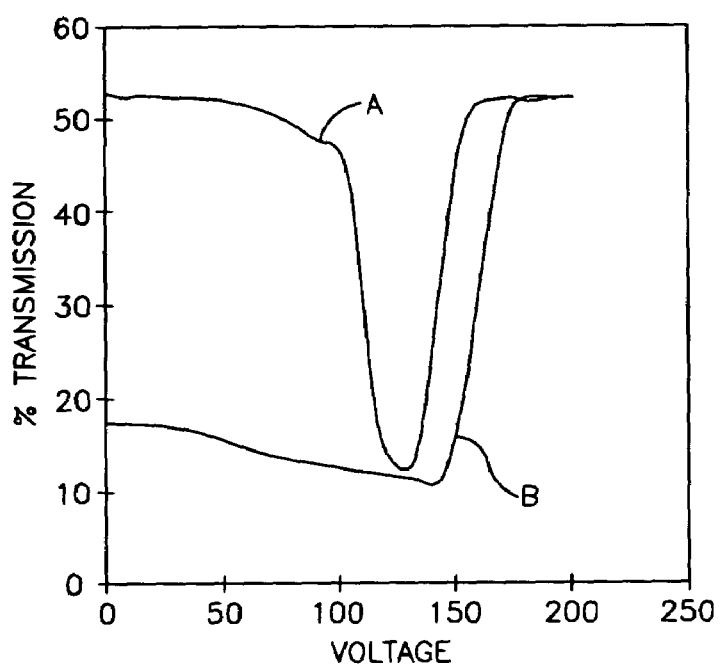
FIG. 12 is a plot of the electro-optic response of a cell to AC pulses of varying voltages, which demonstrates grey scale characteristics.

The grey scale response of the cell in response to pulses of varying voltage is also seen in FIG. 12. Here the voltage of the pulse was varied and the reflection (% transmission) from the cell was measured. Curve A is the response of the cell when the material is in the reflecting state prior to each pulse. Prior to each pulse plotted on curve A the material was subjected to a high AC pulse to ensure that it was completely in the reflecting state prior to the pulse. When the voltage of the pulse is below about 30V, the reflection of the cell is not significantly affected. When the voltage of the pulse is between about 40V and 110V, the reflectivity of the cell decreases approximately linearly as the voltage of the pulse is increased. Grey scale reflectivity is observed in this voltage range. In each case the material continued to reflect after the pulse was removed. When the voltage of the pulse was increased to from about 120 to 130V, the material was in the scattering state and exhibited near maximum scattering. When the magnitude of the pulse was increased still further above about 150 to 160V, the reflectivity of the cell increased until the reflectivity approximated its original value, i.e., that of the reflecting state, above 180V.

Curve B shows the response of the cell when the material was initially in the focal conic scattering state prior to the AC pulse. Here the reflectivity of the cell does not significantly change for AC pulses below about 30V. Between about 50 and 150V the scattering actually increases slightly and maximum scattering is observed from the cell. Above about 160V the transmission quickly increased and the cell switched to the reflecting state approximating the maximum transmission above about 180V.

It can be seen that the linear relationship of the grey scale to voltage is much more pronounced, and the grey scale more gradual, when the material starts from the planar texture. Accordingly, most practical applications of the grey scale phenomenon will likely employ the material starting from the planar texture.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

The invention claimed is:

1. A method of producing additive and monochrome color images from a stacked chiral nematic liquid crystal display, comprising:

passing incident light into a first layer of the display, said first layer comprising first chiral nematic liquid crystal material, the liquid crystal of said first material having a pitch length effective to reflect visible light of a first color;

electrically addressing said first layer to reflect visible light from the display of said first color by transforming a portion of the liquid crystal of said first layer into a reflective twisted planar texture;

passing said incident light through said first layer into a second layer of the display stacked relative to said first layer, said second layer comprising second chiral nematic liquid crystal material, the liquid crystal of said second material having a pitch length effective to reflect visible light of a second color;

electrically addressing said first layer and said second layer to reflect visible light from the display of said second color by transforming a portion of the liquid crystal of said second layer into the reflective twisted planar texture and a portion of the liquid crystal of said first layer into the focal conic texture; and electrically addressing said first layer and said second layer to reflect visible light from the display of a color that is additive of said first color and said second color by transforming portions of the liquid crystal of said first layer and said second layer into the reflective twisted planar texture.

2. The method of claim 1 comprising:

passing said incident light through said first layer, through said second layer and into a third layer of the display stacked relative to said first layer and said second layer, said third layer comprising third chiral nematic liquid crystal material, the liquid crystal of said third material having a pitch length effective to reflect visible light of a third color;

electrically addressing said first layer, said second layer and said third layer to reflect visible light from the display of said third color by transforming a portion of the liquid crystal of said third layer into the reflective twisted planar texture and a portion of the liquid crystal of said first layer and said second layer into the focal conic texture;

electrically addressing said first layer, said second layer and said third layer to reflect visible light from the display of a color that is additive of said third color and said second color by transforming portions of the liquid crystal of said third layer and said second layer into the reflective twisted planar texture and a portion of the liquid crystal of said first layer into the focal conic texture;

electrically addressing said first layer, said second layer and said third layer to reflect visible light from the display of a color that is additive of said third color and said first color by transforming portions of the liquid crystal of said third layer and said first layer into the reflective twisted planar texture and a portion of the liquid crystal of said second layer into the focal conic texture; and electrically addressing said first layer, said second layer and said third layer to reflect visible light from the display of a color that is additive of said first color, said second color and said third color by transforming portions of the liquid crystal of said first layer, said second layer and said third layer into the reflective twisted planar texture.

3. The method of claim 1, wherein said incident light travels in a direction sequentially through said first region and said second region, said first region being closest to a viewer, comprising a light absorbing layer disposed downstream of said second region relative to said direction of incident light; and absorbing said incident light passing through said first region and said second region with said light absorbing layer.

4. The method of claim 2 wherein incident light travels in a direction sequentially through said first region, said second region and said third region, said first region being closest to a viewer, comprising a light absorbing layer disposed downstream of said third region relative to said direction of incident light; and absorbing said incident light passing through said first region, said second region and said third region with said light absorbing layer.

5. The method of claim 1 wherein said first layer and said second layer have a uniform thickness of said first liquid crystal material and said second liquid crystal material, respectively, across an entire viewing area of the display.

6. The method of claim 2 wherein said first layer, said second layer and said third layer have a uniform thickness of said first liquid crystal material, said second liquid crystal material, and said third liquid crystal material, respectively, across an entire viewing area of the display.

* * * * *